(12) United States Patent
Pineda Amo

(10) Patent No.: US 10,006,440 B2
(45) Date of Patent: Jun. 26, 2018

(54) METHOD OF OPERATING A WIND TURBINE

(71) Applicant: ALSTOM RENOVABLES ESPAÑA, S.L., Barcelona (ES)

(72) Inventor: Isaac Pineda Amo, Sant Cugat del Vallès (ES)

(73) Assignee: GE Renewable Technologies Win B.V., Breda (NL)

( * ) Notice: Subject to any disclaimer, the term of this patent is extended or adjusted under 35 U.S.C. 154(b) by 810 days.

(21) Appl. No.: 14/154,043

(22) Filed: Jan. 13, 2014

(65) Prior Publication Data

US 2014/0199156 A1 Jul. 17, 2014

Related U.S. Application Data

(60) Provisional application No. 61/802,964, filed on Mar. 18, 2013.

(30) Foreign Application Priority Data

Jan. 17, 2013 (EP) .................................... 13382014

(51) Int. Cl.
F03D 7/02 (2006.01)

(52) U.S. Cl.
CPC ......... *F03D 7/0276* (2013.01); *F03D 7/0224* (2013.01); *Y02E 10/723* (2013.01)

(58) Field of Classification Search
CPC .... F03D 7/0276; F03D 7/0224; F03D 7/0272; F03D 7/04; F05B 2270/101; F05B 2270/1012; F05B 2270/104; F05B 2270/106; F05B 2270/1033; F05B 2270/32; F05B 2270/327; F05B 2270/328; F05B 2270/335; F05B 2270/708; F05B 2270/8042; Y02E 10/723
See application file for complete search history.

(56) References Cited

U.S. PATENT DOCUMENTS 7,298,059 B2 * 11/2007 Delmerico .............. F03D 7/028
307/85
2011/0049885 A1 * 3/2011 Hernandez
Mascarell ............ F03D 7/0224
290/44

FOREIGN PATENT DOCUMENTS

| EP | 2 253 838 | 11/2010 | |
|---|---|---|---|
| EP | 2 292 928 | 3/2011 | |
| EP | 2 479 426 | 7/2012 | |
| GB | 2 479 415 | 10/2011 | |
| GB | 2479415 A * | 10/2011 | ........... F03D 7/0224 |
| WO | WO 2008/006020 | 1/2008 | |
| WO | WO 2011128470 A2 * | 10/2011 | ........... F03D 7/0224 |

OTHER PUBLICATIONS

European Search Report for EP13382014, dated Jul. 18, 2013, 5 pgs.

* cited by examiner

*Primary Examiner* — Igor Kershteyn
*Assistant Examiner* — Brian P Wolcott
(74) *Attorney, Agent, or Firm* — Dority & Manning, P.A.

(57) ABSTRACT

A method of operating a variable speed wind turbine as a function of a wind speed is disclosed. The method comprises following a power curve describing the operation of the wind turbine as a function of wind speed in steady-state conditions. The method further comprises changing the pitch angles of the blades in transient conditions in which the wind turbine cannot follow the power curve in the second operational range.

18 Claims, 6 Drawing Sheets

METHOD OF OPERATING A WIND TURBINE

This application claims the benefit of European Patent Application 13 382 014.2 filed on Jan. 17, 2013 and U.S. Provisional Patent Application Ser. No. 61/802,964 filed on Mar. 18, 2013, which are herein incorporated by reference in their entirety for all purposes.

The present disclosure relates to methods of operating a wind turbine.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A variable speed wind turbine may typically be controlled by varying the generator torque and the pitch angle of the blades. As a result, aerodynamic torque, rotor speed and electrical power will vary.

A common prior art control strategy of a variable speed wind turbine is described with reference to FIG. 1. In FIG. 1, the operation of a typical variable speed wind turbine is illustrated in terms of the pitch angle (β), the electrical power generated (P), the generator torque (M) and the rotational velocity of the rotor (o), as a function of the wind speed (V(m/s). The curve representing the electrical power generated as a function of wind speed is typically called a power curve having a first operational range (I), a second operational range (II), a third operational range (III), and a fourth operational range (IV).

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be varied so as keep the tip speed ratio A (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation: $T = k \cdot \omega^2$, wherein k is a constant, and w is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine.

The before described operation may be translated into a so-called power curve, such as the one shown in FIG. 1. Such a power curve may reflect the optimum operation of the wind turbine under steady-state conditions.

However, in non-steady state (transient) conditions, the operation may not necessarily be optimum.

As further background, basic aerodynamic behaviour of (the blades of) a wind turbine is explained with reference to FIGS. 2a-2d.

In FIG. 2a, a profile of a wind turbine blade is depicted in operation. The forces generated by the aerodynamic profile are determined by the wind that the profile "experiences", the effective wind speed $V_e$. The effective wind speed is composed of the axial free stream wind speed $V_a$ and the tangential speed of the profile $V_t$. The tangential speed of the profile $V_t$ is determined by the instantaneous rotor speed w and the distance to the centre of rotation of the profile, the local radius r, i.e. $V_t = \omega \cdot r$.

The axial free stream wind speed $V_a$ is directly dependent on the wind speed $V_w$, and on the speed of the wind downstream from the rotor $V_{down}$, that is $V_a = \frac{1}{2}(V_w + V_{down})$. The axial free stream wind speed may e.g. be equal to approximately two thirds of the wind speed $V_w$.

The resultant wind flow, or effective wind speed $V_e$, generates lift L and drag D on the blade. A blade may theoretically be divided in an infinite number of blade sections, each blade section having its own local radius and its own local aerodynamic profile. For any given rotor speed, the tangential speed of each blade section will depend on its distance to the rotational axis of the hub (herein referred to as local radius).

The lift generated by a blade (section) depends on the effective wind speed $V_e$, and on the angle of attack of the blade (section) α, in accordance with the following formula:

$$L = \frac{1}{2} \rho \cdot C_L V_e^2 \cdot S,$$

wherein
ρ is the air density, $V_e$ is the effective wind speed, $C_L$ is the lift coefficient (dependent on the angle of attack α), and S is the surface of the blade section.

Similarly, the drag D generated by a blade section can be determined in accordance with the following equation:

$$D = \frac{1}{2} \rho \cdot C_D V_e^2 \cdot S,$$

wherein $C_D$ is the drag coefficient dependent on the angle of attack $\alpha$.

For an entire wind turbine blade, the contribution to lift and drag of each blade section should be summed to arrive at the total drag and lift generated by the blade.

Both the drag coefficient $C_D$ and the lift coefficient $C_L$ depend on the profile or the blade section and vary as a function of the angle of attack of the blade section. The angle of attack $\alpha$ may be defined as the angle between the chord line of a profile (or blade section) and the vector of the effective wind flow, see FIG. 2a.

FIG. 2b illustrates in a very general manner how the lift coefficient and drag coefficient may vary as a function of the angle of attack of a blade section. Generally, the lift coefficient (reference sign 21) increases to a certain maximum at a so-called critical angle of attack 23. This critical angle of attack is also sometimes referred to as stall angle. The drag coefficient (reference sign 22) may generally be quite low and starts increasing in an important manner close to the critical angle of attack 23. This rapid change in aerodynamic behaviour of a profile or blade section is linked generally to the phenomenon that the aerodynamic flow around the profile (or blade section) is not able to follow the aerodynamic contour and the flow separates from the profile. The separation causes a wake of turbulent flow, which reduces the lift of a profile and increases the drag significantly.

The exact curves of the lift coefficient and drag coefficient may vary significantly in accordance with the aerodynamic profile chosen. However, in general, regardless of the aerodynamic profile chosen, a trend to increasing lift up until a critical angle of attack and also a rapid increase in drag after a critical angle of attack can be found.

In accordance with FIG. 2a, the tangential force generated by a blade section is given by $T=L \cdot \sin(\alpha+\theta)-D \cdot \cos(\alpha+\theta)$, wherein $\theta$ is the pitch angle and $\alpha$ is the angle of attack. The pitch angle may be defined as the angle between the rotor plane and the chord line of a profile. Integrating the tangential force distribution over the radius provides the driving torque.

In order to increase the torque generated by the rotor, the angle of attack of any blade section is preferably kept below the critical angle of attack such that lift may be higher and drag may be lower.

It should be borne in mind that the angle of attack of each blade section depends on the tangential speed of the specific rotor blade section, the wind speed, the pitch angle and the local twist angle of the blade section. The local twist angle of a blade section may generally be considered constant, unless some kind of deformable blade is used. The tangential speed of the rotor blade section depends on the rotor speed (angular velocity of the rotor which is obviously the same for the whole blade and thus for each blade section) and on the distance of the blade section to the rotational axis.

For a given pitch angle, it follows that the angle of attack is determined by the tip speed ratio:

$$\lambda = \frac{\omega \cdot R}{V_w}.$$

From this, it follows that the torque generated by a rotor blade section may become a rather complicated function of the instantaneous tip speed ratio and the pitch angle of the blade.

This complicated relationship between the tip speed ratio, pitch angle, and performance of the rotor may be depicted in a three-dimensional figure, such as the one shown as FIG. 2c.

For every rotor blade section, the torque generated may be correlated to one of the lines of FIG. 2d of constant pitch angle. These lines may be obtained by a cross-section of a three-dimensional figure such as the one shown in FIG. 2c or similar.

The lines depict the power coefficient ($C_p$), i.e. the ratio between the mechanical power captured by the wind turbine rotor and the available power in the wind, as a function of $\lambda$ and for different pitch angles. As the power captured by the wind turbine is directly related to the generated torque, $C_p$ curves provide information about the torque dependence on pitch angle. For each pitch angle, there is a certain critical tip speed ratio. Below this tip speed ratio, stall may occur, i.e. the angle of attack is higher than the previously mentioned critical angle of attack.

This may be illustrated in an alternative manner, such as shown in FIG. 2e. For a given tip speed ratio, e.g. $\lambda_1$, there is a certain critical pitch angle $\theta_{crit}$, which corresponds to a critical angle of attack. Below that pitch angle, stall may occur. At the same time, at the critical pitch angle, the generated torque is maximum.

In the second operational range mentioned before, the pitch angle is generally equal to zero. For a given pitch angle, there is a certain tip speed ratio that gives the highest $C_p$, i.e. the most efficient operation point. In this second operational range of wind speed, the generator torque is adjusted a function of the rotor speed, in accordance with $T=k \cdot \omega^2$. This operation is based on keeping a constant tip speed ratio and maximum $C_P$.

In practice, instead of using measurements from an anemometer to determine the wind speed and from that the appropriate generator torque, the rotor speed is generally used. The rotor speed may be measured e.g. by measuring the generator rotor speed. In direct drive wind turbines, the rotor speed will correspond to the generator rotor speed, and in wind turbines employing a gearbox, there will generally be a fixed ratio between generator rotor speed and rotor speed.

Let's now suppose that a sudden wind speed variation occurs, e.g. a significant increase in wind speed in a relatively short time. Due to the inertia of the rotor, the rotor speed will not immediately increase. As such, the tip speed ratio of the rotor changes and the wind turbine will not be operating at maximum $C_p$ until the rotor is capable of adapting its speed to said new wind conditions. In an even worse scenario, turbulent wind conditions with continuously varying wind speeds might exist. In such case, the inertia of the rotor does not permit tracking of the wind speed at any time, so the wind turbine will not be operating at maximum $C_p$ unless said wind turbulence decreases. Wind energy that could be converted into electrical energy is thus being lost. It is important to bear in mind that the second operational range may occur relatively frequently throughout a wind turbine's life, so a suboptimum operation in this range may have significant effects.

There still exists a need for a method of operating a wind turbine that at least partially reduces the aforementioned problems.

SUMMARY

According to a first aspect, a method of operating a variable speed wind turbine as a function of a wind speed is provided. The wind turbine has a rotor with a plurality of blades, and one or more pitch mechanisms for rotating the blades. The method comprises following a power curve describing the operation of the wind turbine as a function of wind speed in steady-state conditions. The power curve comprises a sub-nominal zone of operation for wind speeds below the nominal wind speed and a supra-nominal zone of operation for wind speeds above the nominal wind speed. In steady-state conditions in the sub-nominal zone of operation, the blades are not pitched.

The sub-nominal zone of operation comprises a first operational range, a second operational range and a third operational range, wherein the first operational range extends from a cut-in wind speed to a first wind speed, wherein the rotor speed is kept substantially constant at a first value, the second operational range extends from the first wind speed to a second wind speed, wherein both the rotor speed and generator torque are varied as a function of wind speed, and the third operational range extends from the second wind speed to the nominal wind speed, wherein the rotor speed is kept substantially constant at a second value. The method further comprises changing the pitch angles of the blades in transient conditions in which the wind turbine cannot follow the power curve in the second operational range.

In accordance with this aspect, contrary to conventional wisdom, the pitch angle of the blades is changed in the sub-nominal zone of operation in order to maximise energy further.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 3:
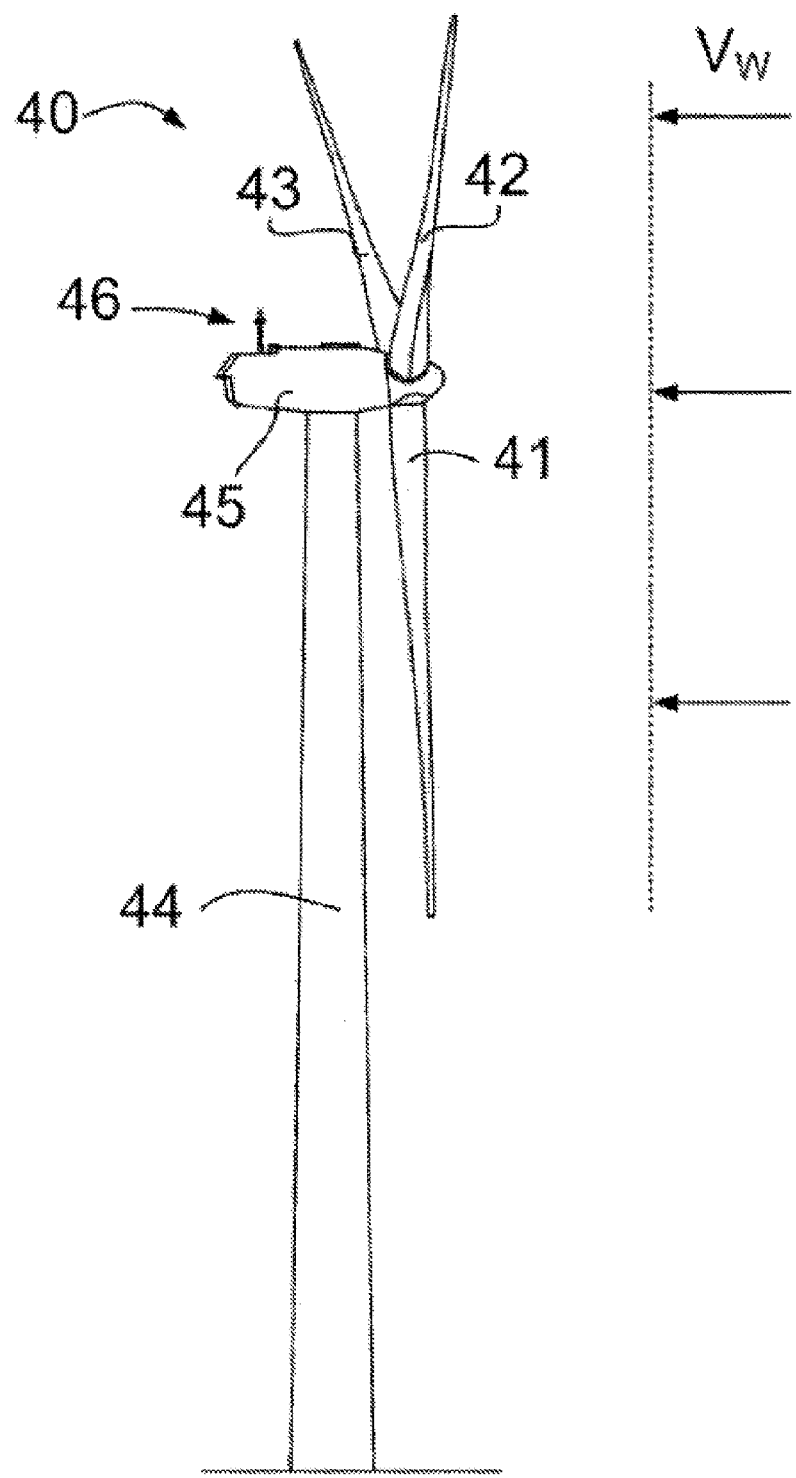
FIG. 3 illustrates a wind turbine.

FIG. 3 illustrates a wind turbine 40 having a rotor with three blades 41, 42 and 43. A nacelle 45 is mounted on wind turbine tower 44. An anemometer 46 is mounted on the nacelle 45. The anemometer 46 may be used to measure wind speed, however because of its location on the nacelle, behind the rotor, the wind speed measured by the anemometer may vary a lot and in general may not be very reliable.

Figure 1:
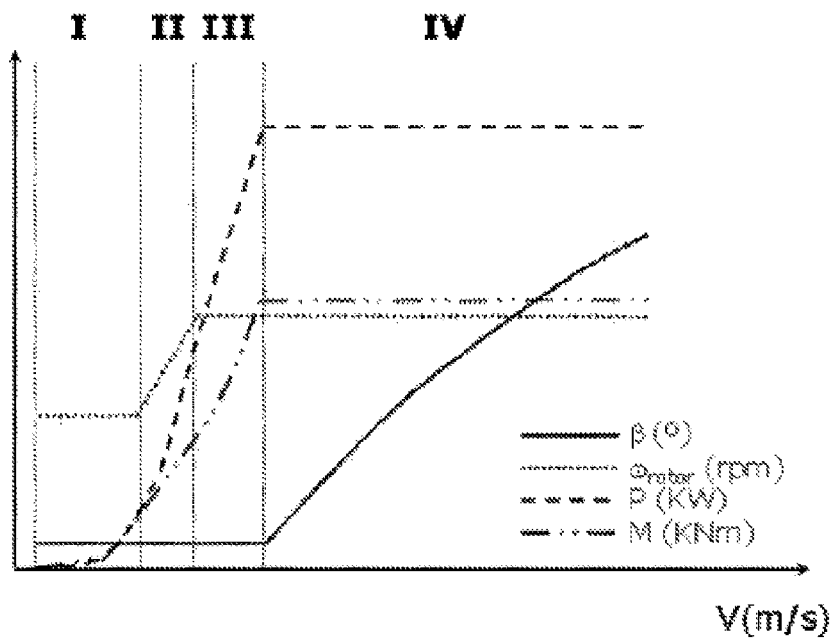
FIG. 1 illustrates a typical power curve of a wind turbine.
Figure 2A:
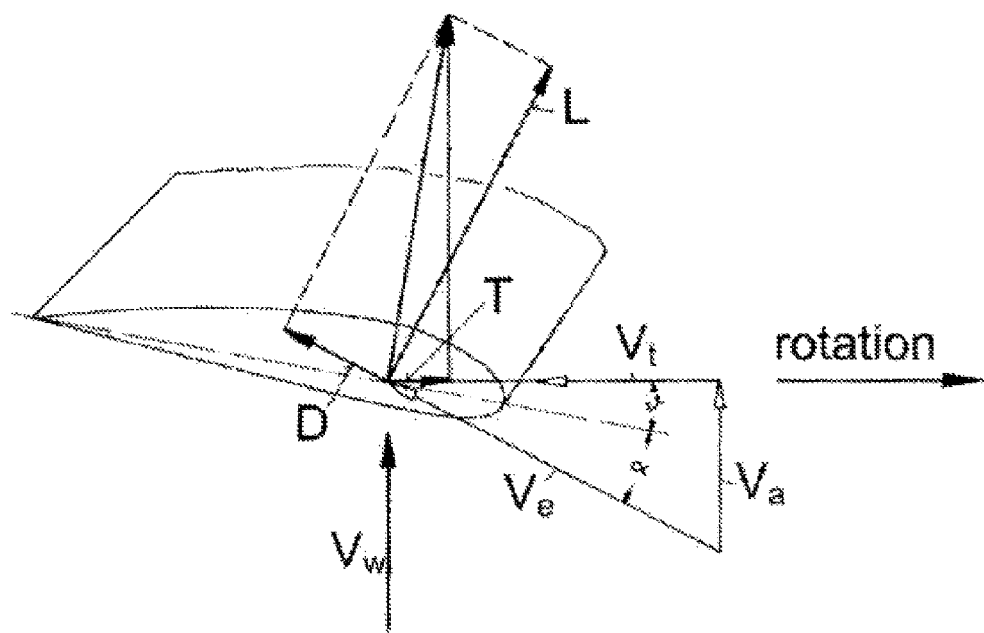
FIGS. 2a-2e illustrate aerodynamics of wind turbine blades and aerodynamic profiles in general.
Figure 2B:
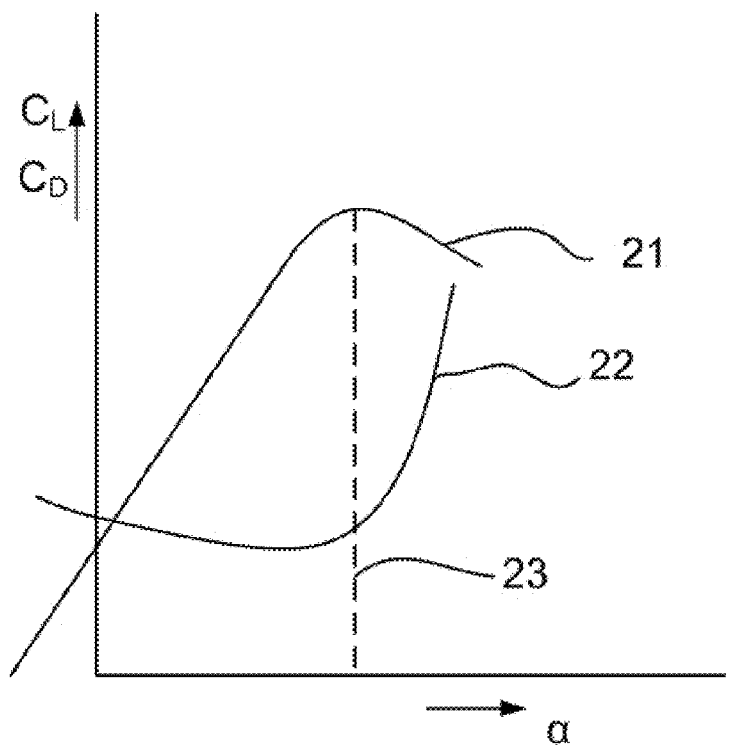
Figure 2C:
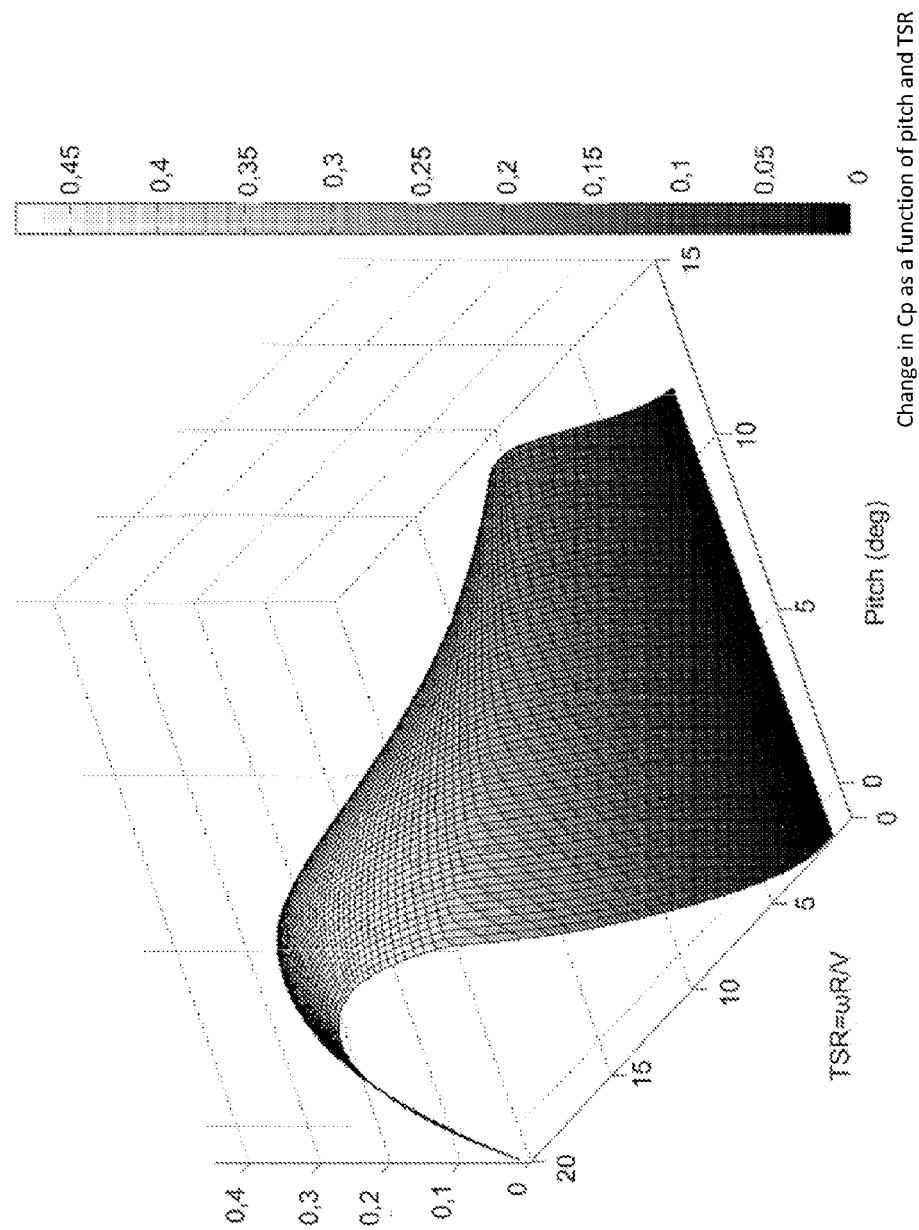
Figure 2D:
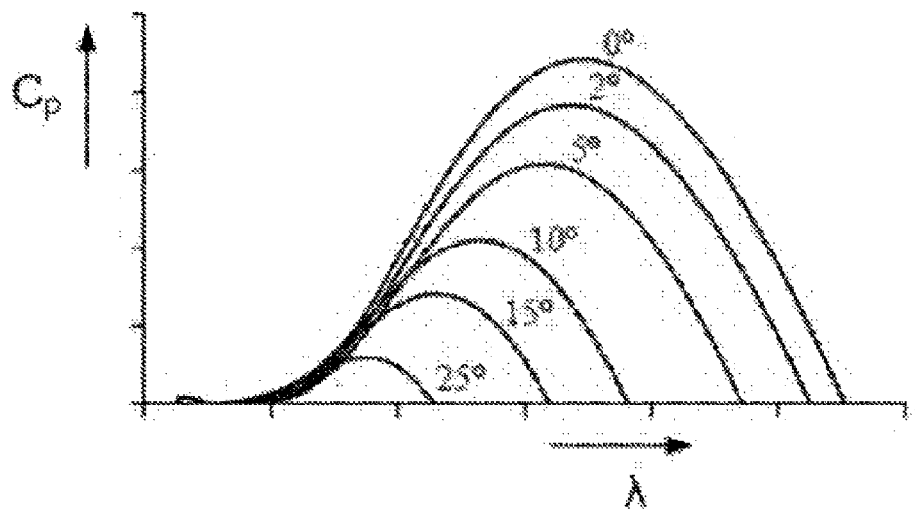
Figure 2E:
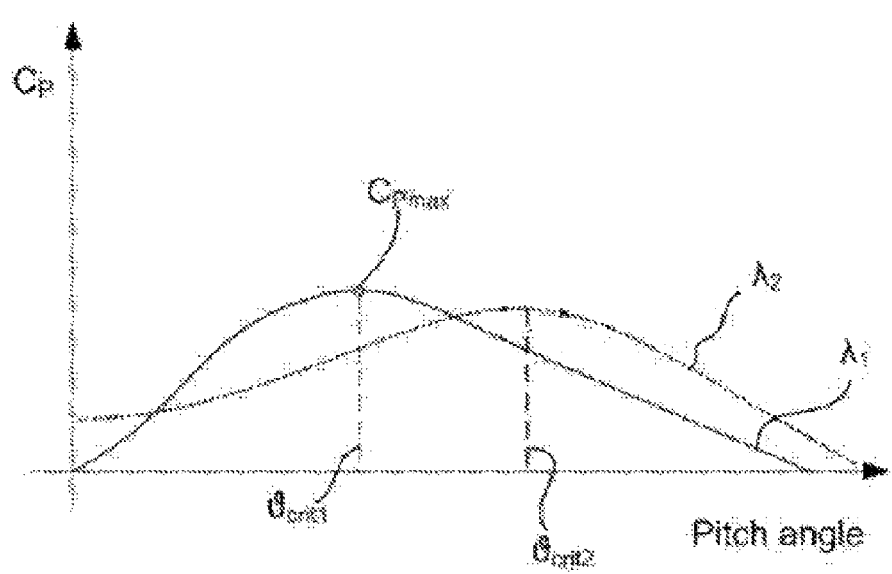

The wind turbine may have one or more pitch systems to rotate the blades 41, 42, 43 collectively or individually. FIG. 1 represents a typical power curve for a variable speed wind turbine with pitch capability. As mentioned before, above the nominal wind speed, the generator torque and rotor speed are maintained constant even though the wind speed increases. This is achieved by pitching the wind turbine blades, i.e. by rotating the blades along their longitudinal axes and with respect to the hub; by increasing the pitch of the blades, their angle of attack decreases and their contribution to the torque also decreases.

Below the nominal wind speed, the pitch of the blades is generally not changed (neither individually, nor collectively). Generator torque and rotor speed are used in the control of the wind turbine.

The ideal power curve as depicted in FIG. 1 may most reliably be followed if the control systems are directly controlled by a sensor indicating the rotor speed. The rotational speed of the rotor may be measured directly or may be determined by measuring the rotational speed of the generator rotor.

Figure 4:
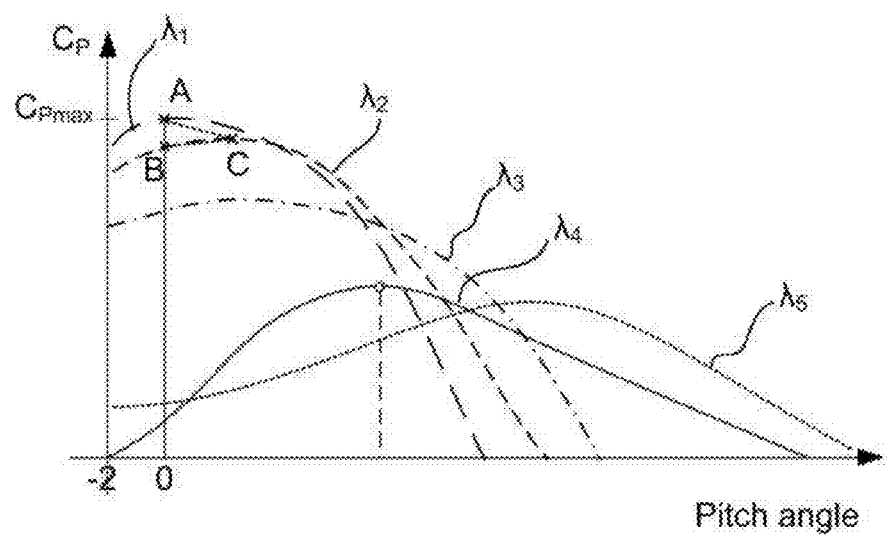
FIG. 4 illustrates an example of a method according to the present invention.

In the second operational range, the generator torque is controlled such that the tip speed ratio is maintained constant. With reference to FIG. 4, in the second operational range, the wind turbine is expected to operate at maximum $C_P$, $C_{P,max}$ (power coefficient). In order to maintain said $C_{P,max}$, blade pitch is typically kept at the "below rated pitch position", whereas the tip speed ratio should be maintained equal to $\lambda_1$ by properly adjusting rotor speed to varying wind speed conditions.

A problem may arise in case of transients wind conditions. If the wind speed suddenly increases, due to the inertia of the rotor, the tip speed ratio will actually decrease (wind speed increases, but the rotational speed does not increase yet), e.g. to tip speed ratio $\lambda_2$, so that the wind turbine will not operate at optimum tip speed ratio $\lambda_1$ anymore.

As may be seen in FIG. 4, the point of operation may have moved from point A to point B. At this point, the power coefficient is not maximum. It may take a while before the turbine rotor increases enough to be back at point A, i.e. it may take a while before the rotor speed increases enough to return to the original tip speed ratio, $\lambda_1$. During this time, it may be beneficial to use the pitch angle of the blades to generate more electrical power. If the actual instantaneous tip speed ratio is $\lambda_2$, then by pitching the blades slightly, a more efficient operation (not the optimum point of operation) may be achieved.

With reference to FIG. 4, the point of operation may be moved to(wards) point C. At point C, more electrical power is being generated than at point B. The temporary power coefficient $C_p$ may be increased and may be maximized for the instantaneous tip speed ratio. Even if the power coefficient does not reach $C_{pmax}$ the electrical power generated may be increased.

As the blades are pitched (e.g. all blades having the same pitch angle), the rotor speed may change as well and thus the tip speed ratio also. The pitch angles of the blades may be selected so as to achieve the maximum power coefficient available at each instantaneous tip speed ratio if possible. Because of continuously changing wind speed (and in case of transients, rotor speed), the pitch control may be adapted to only slightly pitch and increase the power coefficient "a little". The temporary power coefficient may not even reach the maximum for each temporary instantaneous tip speed ratio. Since this kind of wind transient may occur relatively often, a consistent implementation of this strategy may end up generating a significant amount of electrical power.

In some examples, in case of transient wind conditions, in order to maximize electrical power, the pitch angle (which may optionally be applied to all blades at the same time) is selected based on the instantaneous tip speed ratio. This tip speed ratio may be determined based on a measured rotor speed or a measured generator rotor speed. For the determination of the instantaneous wind speed, a LIDAR may be used if available. Alternatively, a nacelle mounted anemometer may be used for determining an instantaneous wind speed, and thus able to determine an instantaneous tip speed ratio. If an anemometer is used, in some examples, an average wind speed as measured over e.g. 1-5 seconds may be used. In some cases, the average wind speed may be measured over e.g. 2-4 seconds, e.g. approximately 3 seconds.

By basing the pitch angle on the instantaneous tip speed ratio and on the information available on the aerodynamic behaviour of the wind turbine, more electrical power may be generated in this operational range. Eventually, in the event of an increase of wind speed, the rotor speed will increase so that the tip speed ratio returns to its original value. As such, the pitch angle will have to return to the original value, i.e. zero in this case, to return to point A of most efficient operation.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a variable speed wind turbine as a function of a wind speed, the variable speed wind turbine having a rotor with a plurality of blades and one or more pitch mechanisms for rotating at least one blade of the plurality of blades, the method comprising:
   in steady-state conditions following a power curve describing the operation of the variable speed wind turbine,
   the power curve comprising a sub-nominal zone of operation for wind speeds below a nominal wind speed and a supra-nominal zone of operation for wind speeds above the nominal wind speed, and wherein
   in steady-state conditions in the sub-nominal zone of operation, each blade of the plurality of blades is not pitched, and wherein
   the sub-nominal zone of operation comprises a first operational range, a second operational range and a third operational range, wherein
      the first operational range extends from a cut-in wind speed to a first wind speed, wherein a rotor speed is kept substantially constant at a first value,
      the second operational range extends from the first wind speed to a second wind speed, wherein both the rotor speed and a generator torque are varied as a function of wind speed while a pitch angle of each blade of the plurality of blades is kept constant, and
      the third operational range extends from the second wind speed to the nominal wind speed, wherein the rotor speed is kept substantially constant at a second value, and
   the method further comprising in transient conditions in which the variable speed wind turbine cannot follow the power curve in the second operational range, changing the pitch angle of each blade of the plurality of blades as a function of a change in a tip speed ratio caused by the transient conditions so as to increase a power coefficient of the plurality of blades during the transient conditions by:
      measuring instantaneous wind speed;
      computing an instantaneous tip speed ratio for the measured instantaneous wind speed; and
      changing the pitch angle of each blade of the plurality of blades to approach a maximum power coefficient based on the instantaneous lip speed ratio.

2. The method according to claim 1, wherein the pitch angle of each blade of the plurality of blades is selected so as to achieve the maximum power coefficient available at the instantaneous tip speed ratio during the transient conditions.

3. The method according to claim 1, wherein the instantaneous tip speed ratio during the transient conditions is determined based on the instantaneous wind speed measured by a nacelle mounted anemometer.

4. The method according to claim 3, wherein the instantaneous wind speed measured by the nacelle mounted anemometer is an average wind speed measured over a short period of time.

5. The method according to claim 4, wherein the short period of time is 1-5 seconds.

6. The method according to claim 5, wherein the short period of time is between 2-4 seconds.

7. The method according to claim 6, wherein the short period of time is approximately 3 seconds.

8. The method according to claim 1, wherein the instantaneous tip speed ratio is determined based on a generator speed.

9. The method according to claim 2, wherein the instantaneous tip speed ratio is determined based on the instantaneous wind speed measured by a nacelle mounted anemometer.

10. The method according to claim 9, wherein the instantaneous wind speed measured by the nacelle mounted anemometer is an average wind speed measured over a short period of time.

11. The method according to claim 10, wherein the short period of time is 1-5 seconds.

12. The method according to claim 2, wherein the instantaneous tip speed ratio is determined based on a generator speed.

13. The method according to claim 3, wherein the instantaneous tip speed ratio is determined based on a generator speed.

14. The method according to claim 4, wherein the instantaneous tip speed ratio is determined based on a generator speed.

15. The method according to claim 5, wherein the instantaneous tip speed ratio is determined based on a generator speed.

16. The method according to claim 6, wherein the instantaneous tip speed ratio is determined based on a generator speed.

17. The method according to claim 7, wherein the instantaneous tip speed ratio is determined based on a generator speed.

18. The method according to claim 11, wherein the instantaneous tip speed ratio is determined based on a generator speed.

* * * * *